United States Patent
Fevre et al.

(10) Patent No.: US 8,864,490 B2
(45) Date of Patent: Oct. 21, 2014

(54) DEVICE FOR INJECTING AT LEAST TWO PRESSURIZED FLUIDS INTO THE NECK OF A CONTAINER IN ORDER TO FORM SAID CONTAINER

(75) Inventors: Sebastien Fevre, Octeville-sur-Mer (FR); Guy Feuilloley, Octeville-sur-Mer (FR)

(73) Assignee: Discma AG, Hünenberg (CH)

( * ) Notice: Subject to any disclaimer, the term of this patent is extended or adjusted under 35 U.S.C. 154(b) by 89 days.

(21) Appl. No.: 13/810,922

(22) PCT Filed: Jul. 12, 2011

(86) PCT No.: PCT/EP2011/061831
§ 371 (c)(1),
(2), (4) Date: Jan. 18, 2013

(87) PCT Pub. No.: WO2012/010461
PCT Pub. Date: Jan. 26, 2012

(65) Prior Publication Data
US 2013/0122136 A1    May 16, 2013

(30) Foreign Application Priority Data

Jul. 20, 2010   (FR) .................................... 10 55883

(51) Int. Cl.
| | |
|---|---|
| *B29C 49/18* | (2006.01) |
| *B29C 49/58* | (2006.01) |
| *B29D 22/00* | (2006.01) |
| *B65B 3/02* | (2006.01) |
| *B29C 49/46* | (2006.01) |
| *B29C 49/06* | (2006.01) |

(52) U.S. Cl.
CPC ....... *B29D 22/003* (2013.01); *B29C 2049/4664* (2013.01); *B29C 2049/465* (2013.01); *B29C 2049/5803* (2013.01); *B29C 49/46* (2013.01); *B65B 3/022* (2013.01); *B29C 2049/5841* (2013.01); *B29C 2049/5827* (2013.01); *B29C 49/58* (2013.01); *B29C 2049/5837* (2013.01); *B29C 49/06* (2013.01)

USPC .......................................... 425/524; 425/535

(58) Field of Classification Search
USPC ................................................. 425/524, 535
See application file for complete search history.

(56) References Cited

U.S. PATENT DOCUMENTS 6,485,669 B1 * 11/2002 Boyd et al. ................... 264/521
7,892,477 B2    2/2011 Hirdina
(Continued)

FOREIGN PATENT DOCUMENTS

DE   10 2004 014 653 A1   10/2005
EP      2 143 544 A1       1/2010
(Continued)

OTHER PUBLICATIONS

International Search Report, dated Oct. 4, 2011, from corresponding PCT application.

*Primary Examiner* — Robert B Davis
(74) *Attorney, Agent, or Firm* — Brinks Gilson & Lione

(57) ABSTRACT

A device (24) for injecting at least two pressurized fluids into the axially oriented neck (20) of a container (18) in the preform state in order to form a final container by deforming the container (18) by successively injecting a first pressurized fluid and then a second pressurized fluid, the device (24) including: a first duct for supplying a first pressurized fluid; a second duct (30) for supplying a second pressurized fluid; and an axial nozzle (32) into which the second supply duct (30) opens, the nozzle being intended to be placed concentrically inside the neck (20) with a radial gap (j) so as to allow the first pressurized fluid to be injected into the container (18) through the radial gap (j), characterized in that the second pressurized fluid used for forming the container (18) consists of an incompressible filling liquid.

11 Claims, 2 Drawing Sheets

(56) References Cited

U.S. PATENT DOCUMENTS

| | | |
|---|---|---|
| 2008/0164642 A1* | 7/2008 | Hirdina ............... 264/528 |
| 2010/0237528 A1 | 9/2010 | Derrien et al. |
| 2011/0094186 A1 | 4/2011 | Chauvin et al. |
| 2011/0135778 A1* | 6/2011 | Andison et al. ............ 425/524 |
| 2013/0113143 A1* | 5/2013 | Fevre et al. ............ 264/524 |
| 2014/0157723 A1* | 6/2014 | Feuilloley ............... 53/127 |

FOREIGN PATENT DOCUMENTS

| | | |
|---|---|---|
| FR | 2 917 004 A1 | 12/2008 |
| JP | 08-290465 | 11/1996 |
| WO | WO 9950047 A1 * | 10/1999 |
| WO | 01/19594 A1 | 3/2001 |
| WO | 2009/004192 A2 | 1/2009 |
| WO | 2010/003872 A1 | 1/2010 |

* cited by examiner

DEVICE FOR INJECTING AT LEAST TWO PRESSURIZED FLUIDS INTO THE NECK OF A CONTAINER IN ORDER TO FORM SAID CONTAINER

The invention relates to a device for injecting at least two pressurized fluids into the neck of a preform.

The invention relates more particularly to a device for injecting at least two pressurized fluids into the axially oriented neck of a container in the parison state for forming a final container by deforming said container by the successive injection of a first pressurized fluid then of a second pressurized fluid, the device comprising:
 a first supply pipe supplying a first pressurized fluid;
 a second supply pipe supplying a second pressurized fluid.

Thermoplastic containers such as bottles, vials, etc. are manufactured by forming containers in the parison state, which are sometimes known as preforms.

Prior to implementing the forming method, the containers in the parison state are heated in a thermal conditioning oven to confer upon them a structure that is malleable enough to support the forming method.

These containers in the parison state are then introduced into a molding unit with which blow-molding or stretch-blow-molding means are generally combined.

At the end of the forming method, a filling step is carried out. During this filling step, the container in the final state is generally filled with a liquid which is intended to be marketed or transported in the final container.

Document EP-A-2 143 544 has proposed modifying the forming method by using a liquid to finalize the shaping of the container. The method according to this prior art thus comprises a first step of partial expansion of the container from its parison state to an intermediate state by blowing in a low-pressure blow-molding gas, then a second step of filling the container in said intermediate state with a filling liquid, and finally a third state of shape adoption during which the liquid contained in the container is raised to a high pressure in order to confer the final shape upon the container.

The filling liquid is generally incompressible in relation to a gas. This therefore allows for a rapid and effective increase in pressure.

Advantageously, the liquid used during the third step of shape adoption is the liquid that is intended to be transported in the container in the final state. Such a method thus allows the container to be filled with the liquid during the forming method. This notably allows time to be saved by avoiding the need to add a filling operation after the forming method.

It is an object of the present invention to provide a device for injecting blow-molding gas and filling liquid that is more rapid and works better, so as to produce final containers of better quality.

To this end, the invention proposes an injection device of the type described hereinabove, characterized in that the second supply pipe opens into an axial nozzle which is intended to be arranged concentrically inside the neck with a first radial gap so as to allow the first pressurized fluid to pass between the container and the first supply pipe through the first radial gap.

According to other features of the invention:
 the first supply pipe opens into a bell surrounding the neck of the preform in a fluidtight manner;
 the device comprises a sealing mechanism that can be made to switch between an open position in which the first fluid is able to pass through the first radial gap, and a closed position in which a seal plugs the first radial gap between the nozzle and the neck of the container in a fluidtight manner;
 the seal can be interposed radially in the first radial gap between the nozzle and the internal wall of the neck;
 the seal is of annular shape and is arranged externally around the nozzle, the seal being elastically deformable between a contracted state in which the first fluid can pass toward the inside of the container via a second radial space left between the seal and the internal wall of the neck, and an expanded state in which the seal is radially pressed firmly against the internal wall of the neck of the container in order to plug the first radial space in a fluidtight manner;
 the expansion of the seal is brought about by the relative axial sliding of a conical annular wedge of axial axis with respect to the seal;
 the annular seal is mounted to slide axially with respect to the nozzle between a raised retracted position in which the seal is arranged vertically above the neck; and a lowered position of insertion in the first radial gap into the neck, in which position the seal is interposed radially between the nozzle and the neck;
 the conical wedge is carried by the external wall of the nozzle which is mounted to slide axially with respect to the seal so as to cause the seal to switch into its expanded state when the seal is in its lowered position of insertion;
 the wedge is formed as an integral part of the nozzle;
 the sliding of the nozzle is brought about by a piston able to move axially in a cylinder;
 the first fluid consists of a compressible blow-molding gas such as compressed air;
 the second fluid consists of an incompressible filling liquid;
 the device is mounted to slide axially between an upper standby position in which it is arranged some distance above the neck of the container, and a lowered injection position in which the device is able to inject the first pressurized fluid and/or the second pressurized fluid.

Other features and advantages of the invention will become apparent during a study of the detailed description which follows, for an understanding of which reference will be made to the attached drawings among which:

Figure 1:
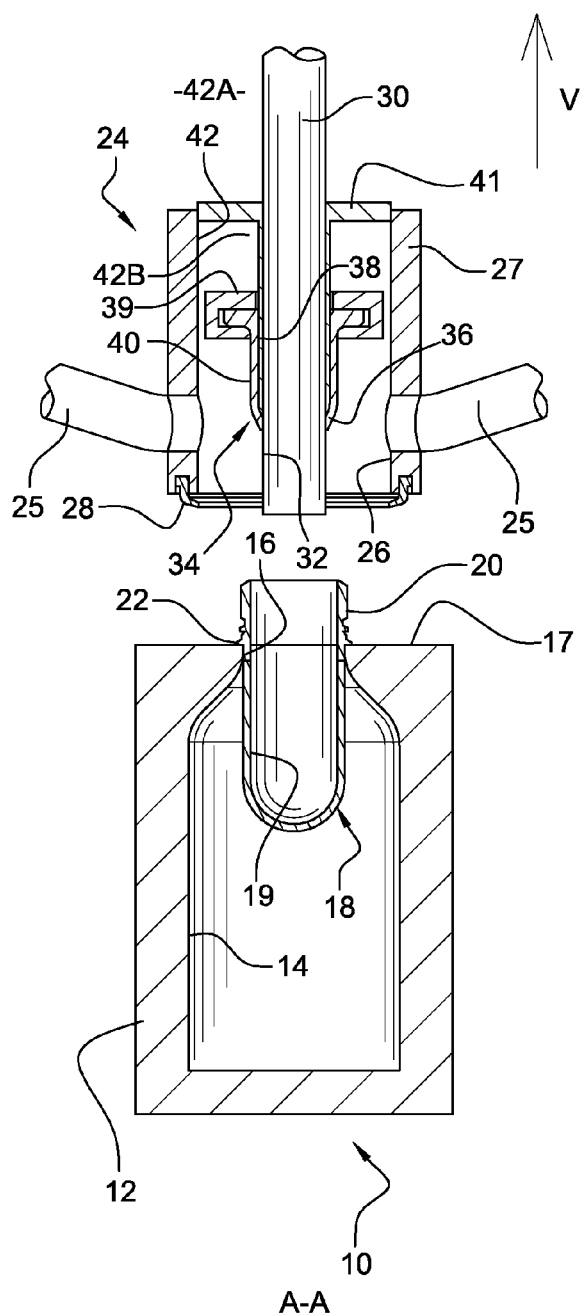
FIG. 1 is a view in axial section depicting the injection device arranged in an upper standby position above the neck of a container which is arranged in a mold, the container being in the parison state.

For the remainder of the description, a bottom-up vertical orientation indicated by the arrow "V" of the figures and a radial orientation directed orthogonally outward from the axis "A" of the container will be adopted nonlimitingly.

For the remainder of the description, elements offering analogous, identical or similar functions will be denoted by the same reference numerals.

FIG. 1 depicts a molding unit 10 that is capable of implementing a forming method comprising at least:

a first step of blowing a first pressurized fluid, which in this instance is a compressible blow-molding gas such as air, then a second step of filling with a second pressurized fluid, which in this instance is an incompressible filling liquid, such as water, which is intended to be packaged in the container.

The molding unit 10 comprises a mold 12 which is generally produced in several parts that can be separated in order to insert and/or extract the container before and after the forming thereof.

Hereinafter, when reference is made to the mold 12 without any further specifics, it is to be understood that the mold 12 is in its assembled position.

The mold 12 in this instance is produced in two parts that can be separated from one another radially. Each part comprises a concave half-impression of the final container that is to be obtained (bottom, walls, shoulder). Thus, when the two parts are assembled to form the mold 12, the two half-impressions form a cavity 14 delimited by an impression of the final shape of the container in the final state.

As an alternative, the molds comprise three parts: one part with the impression of the bottom of the container and two parts to form the walls and shoulder of the container.

The cavity 14 is open vertically upward via an upper orifice 16 formed in a horizontal upper face 17 of the mold 12.

Figure 4:
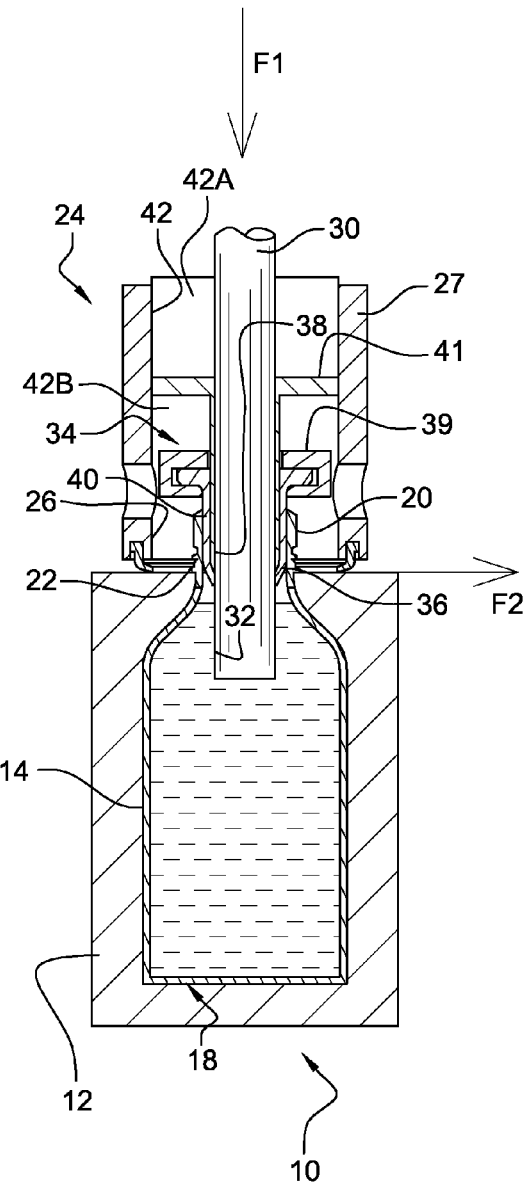
FIG. 4 is a view similar to that of FIG. 3 in which a seal is in an expanded state for plugging a blow-molding gas supply orifice.

The mold 12 is intended to house a container 18 made of a thermoplastic material. Such a container 18 in the parison state is generally known as a preform. The container 18 in the parison state is thermally conditioned beforehand in order to render the thermoplastic material malleable enough for the container 18 to be able to be blow-molded, or expanded, to form a final container having the same shape as the cavity 14, as depicted in FIG. 4.

The container 18 generally comprises a hollow body 19 which is open at the top via an orifice delimited radially by a neck 20 of vertical axis "A", also known as the mouth.

In the known way, the neck 20 of the container 18 generally already has its definitive shape when the container 18 is in the parison state. The dimensions of the neck 20 must therefore not be altered during the forming method. To achieve this, only the body 19 of the container 18 in the parison state is housed in the cavity 14 of the mold 12, the neck 20 extending outside the cavity 14 leaving it via the upper orifice 16 in order to avoid any chance deformation.

Figure 2:
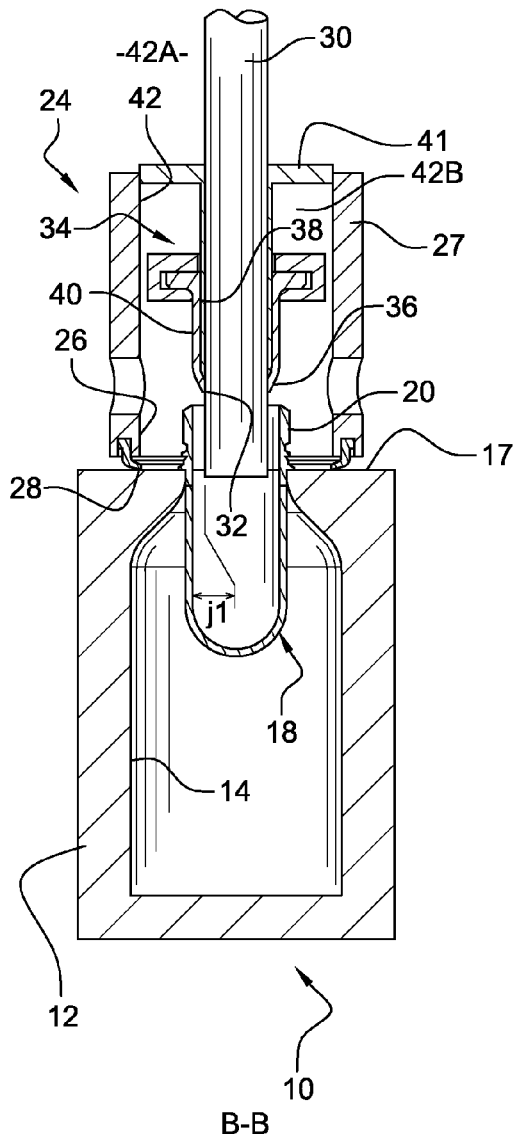
FIG. 2 is a view similar to that of FIG. 1, in which the injection device is in a lower injection position, the seal of the sealing mechanism is in a raised retracted position.
Figure 3:
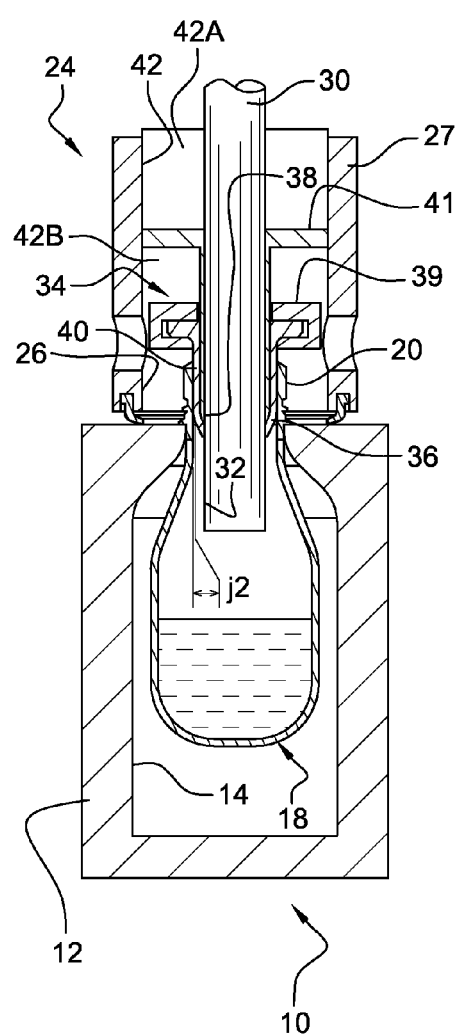
FIG. 3 is a view similar to that of FIG. 1 in which the seal of the sealing mechanism is in a lowered position of insertion and in a contracted state.

In FIGS. 1 and 2, the container 18 has been depicted in the parison state. In FIG. 3, the container 18 is depicted in an intermediate state. In FIG. 4, the container 18 is depicted in its final state. It will be understood that, during the forming of this container 18 into the final container, the neck 20 will maintain its initial shape.

The body 19 of the container 18 is separated from the neck 20 by a flange 22 which projects radially outward. The flange 22 in this instance keeps the neck 20 outside the cavity 14 of the mold 12 by resting against the upper face 17 of the mold 12.

The molding unit 10 comprises a device 24 for injecting at least two pressurized fluids into the neck 20 of axial orientation of a container 18 in order to form a finished container by deforming said container 18 in the parison state during the successive injection of a first pressurized fluid and then of a second pressurized fluid.

In the figures, the injection device 24 depicted has overall symmetry of revolution about the axis "A" of the neck 20.

As explained previously, the first fluid consists of a blow-molding gas such as compressed air at 10 bar, while the second fluid consists of an incompressible liquid, such as water, that can be compressed for example to a pressure of 40 bar.

The device 24 can be made to switch between:

an upper standby position, as depicted in FIG. 1, in which it is arranged some distance above the upper face 17 of the mold 12 so as to allow a container 18 in the parison state to be introduced or a final container to be extracted;

a lower injection position, as depicted in FIGS. 2 to 4, in which the device 24 can inject the pressurized blow-molding gas and/or the pressurized filling liquid.

The device 24 comprises at least one first supply pipe 25 which is connected to a controlled source (not depicted) of compressed air. The first supply pipe 25 opens into a bell 26 which can cover the neck 20 in a fluidtight manner when the nozzle 24 is in its lower position of injection.

The bell 26 is formed in a casing 27 of the device 24.

The lower end edge of the bell 26 is equipped with a seal 28 which is intended to be clamped vertically downward against the upper face 17 of the mold 12 or against the flange 22 of the neck 20. In the example depicted in the figures, this is a lip seal 28 which is intended to be pressed firmly against the upper face 17 of the mold 12 by the pressure of the compressed air with which the bell 26 can be supplied.

The device 24 further comprises a second supply pipe 30 which is connected to a controlled source (not depicted) of pressurized filling liquid. That part of the second supply pipe 30 which is formed in the casing 27 has an orientation of vertical axis "A". The lower end of the second supply pipe 30 opens into an injection nozzle 32 of vertical axis coaxial with the axis "A" of the neck 20 of the container 18.

The nozzle 32 has a cylindrical tubular shape open at the bottom.

The nozzle 32 is intended to be arranged concentrically inside the neck 20 when the device 24 is occupying its lower position of injection. The nozzle 32 has an outside diameter such that, in this lower position, there is a first annular radial gap "j1" surrounding the nozzle 32 and extending radially between the external cylindrical face of the nozzle 32 and the internal cylindrical face of the neck 20. This first radial gap "j1" allows the inside of the container 18 to communicate with the bell 26. Thus, the blow-molding gas is injected into and escapes from the container 18 through this first radial gap "j1".

The injection device 24 also comprises a controlled sealing mechanism 34 which can be made to switch between an open position in which the blow-molding gas is able to pass through the first radial gap "j1" in order to enter or leave the container 18, and a closed position in which a seal 36 plugs the first radial gap "j1" between the nozzle 32 and the neck 20 of the container 18 in a sealed manner.

This controlled sealing mechanism 34 is notably used to allow the pressure of the filling liquid contained in the container 18 to be raised to a high pressure higher than that of the blow-molding gas, for example 40 bar, without causing said filling liquid to escape to the bell 26 through the first radial gap "j1". This notably makes it possible to keep the outside of the neck 20 in the dry in order to make it easier for the closure to be fitted to the final container 18 containing the filling liquid.

The annular seal 36 is arranged externally around the nozzle 32. The seal 36 is elastically deformable between a contracted state as depicted in FIGS. 2 and 3, which corresponds to the open position of the sealing mechanism 34, and an expanded state, as depicted in FIG. 4, in which the annular seal 36 is radially pressed firmly against the internal wall of the neck 20 of the container 18 in order to plug the first radial clearance "j1" in a sealed manner, and which corresponds to the closed position of the sealing mechanism 34.

In its expanded state, the seal 36 applies an outward radial force to the internal wall of the neck 20. This radial force is indicated by the arrow "F2" in FIG. 4. To maintain the integrity of the neck 20, it is advantageous for the seal 36 to be arranged in the region of the flange 22 of the neck 20. This is because the flange 22 forms a sort of rib which enhances the rigidity of the neck 20 at this point, thus avoiding any potential plastic deformation caused by the expansion of the seal 36.

In the example depicted in the figures, the annular seal 36 is advantageously mounted such that it can slide axially with respect to the nozzle 32 between:
 a raised retracted position, as illustrated in FIG. 2, in which the seal 36 is arranged vertically above the neck 20 when the device 24 is in its lowered position of injection, so as not to reduce the bore section available for the passage of blow-molding gas through the first gap "j1", whether this be in the direction of injection into the container 18 or in the direction of escape to the bell 26;
 a lowered position of insertion into the first radial gap "j1" inside the neck 20, as illustrated in FIGS. 3 and 4, in which the seal 36 is interposed radially between the nozzle 32 and the neck 20.

Thus, when the seal 36 is in its raised retracted position, the flow rate of blow-molding gas through the first radial gap "j1" is not limited by the presence of the seal 36.

The seal 36 is, for example, lowered into its lowered position of insertion when the container 18 is almost full, for example 80% full, so as to ensure that the first radial gap "j1" is plugged in a fluidtight manner when the container 18 is full of liquid.

When the seal 36 is in its lowered position of insertion in its contracted state, the first radial gap "j1" is reduced to a second annular radial gap "j2" that remains around the seal 36 between the seal 36 and the internal cylindrical face of the neck 20 so as to allow the blow-molding gas to finish escaping.

The second radial gap "j2" is, of course, smaller than the first radial gap "j1". In this configuration, the flow rate of the blow-molding gas is limited by the presence of the seal 36 but escape of blow-molding gas remains possible. Thus, even when the seal 36 is in the lowered position of insertion, the sealing mechanism 24 is in an open position.

Further, the fact that the seal 36 can be made to slide vertically in its contracted state, makes it possible to prevent the seal 36 from touching the neck 20 as it moves. Thus, neither the neck 20 nor the seal 36 are liable to become damaged.

The seal 36 is made of an elastically deformable elastomeric material. The annular seal 36 in this instance is formed of the free lower end of an axial sleeve tube 40 which is arranged externally around the nozzle 32. The sleeve tube 40 is fixedly mounted in a ring 39 able to slide vertically around the nozzle 32. The downward vertical sliding of the seal 36 is limited by this ring 39 coming vertically into abutment against the upper end edge of the neck 20.

The expansion of the annular seal 36 is brought about by the axial sliding of a conical wedge 38 of axial axis with respect to the annular seal 36. The wedge 38 has an annular shape of an outside diameter substantially equal to the inside diameter of the sleeve tube 40. The wedge 38 is borne fixedly by an external cylindrical wall of the nozzle 32.

The wedge 38 in this instance is produced as an integral part of the nozzle 32.

The nozzle 32 is mounted such as to slide in the casing 27 in order to allow the wedge 38 to slide.

Further, the vertical sliding of the seal 36 between its two positions is brought about by the vertical sliding of the nozzle 32.

Taking as a reference the lower position of injection of the device 24, the nozzle 32 is thus mounted such as to slide vertically in the casing 27 between:
 an extreme raised position, as illustrated in FIGS. 1 and 2, in which the lower end of the nozzle 32 is arranged in the neck 20, and in which the seal 36 is in its contracted state;
 an intermediate position of insertion of the seal 36, as depicted in FIG. 3, in which the seal 36 is driven by the nozzle 32 toward its lowered position of insertion; and
 an extreme lowered plugging position, as depicted in FIG. 4, in which the seal 36 is made to switch into its expanded state by the wedge 38.

In its extreme lowered plugging position, the lower end of the nozzle 32 is arranged near the neck 20 so as to be nearer to the neck 20 than to the bottom of the container 18.

The internal face of the annular seal 36 has a slope inclined toward the axis "A" from the top downward in the direction of the arrow "F1" of FIG. 4. The external face of the wedge 38 has a slope similar to that of the seal 36. Thus, the seal 36 is made to switch between its two states by the sliding of the wedge 38:
 from an upper position of rest, which corresponds to the intermediate position of the nozzle 32, and in which it is arranged above the seal 36,
 to a lower position of expansion, which corresponds to the extreme lowered position of the nozzle 32, and in which the seal 36 is expanded by contact between said slopes.

According to an undepicted alternative form of the invention, it is the annular seal which is mounted to slide vertically with respect to the wedge which is fixed.

The wedge 38 is made to slide by a piston 41 arranged at the upper end of the nozzle 32.

According to other alternative forms of the invention, it will be understood that the wedge may be moved by other means, such as electrical, mechanical or magnetic means.

The nozzle 32 is arranged concentrically inside the sleeve tube 40.

The nozzle 32 extends upward inside the pipe 30 as far as the piston 31 some distance above the ring 39. Further, the nozzle 32 is open axially at the top so as to allow the filling liquid to pass.

The piston 41 is mounted to slide vertically in a cylinder 42 formed in the casing 27. The piston 41 thus divides the cylinder 42 in a fluidtight manner into an upper chamber 42A and a lower chamber 42B. Each fluidtight chamber 42A, 42B has just one associated supply orifice (not depicted).

The piston 41, the nozzle 32 and the wedge 38 thus form an assembly that slides as one between an upper position of rest and a lower position of expansion.

To allow the joint sliding of the nozzle 32 and of the seal 36, a compression spring (not depicted) is, for example, inserted vertically between the piston 41 and the ring 39. Thus, when the ring 39 is in abutment against the neck 20, the downward sliding of the piston 41 drives the nozzle 32 toward its extreme lowered position, compressing the spring.

As an alternative, the ring is in abutment near the neck, against an abutment element of the bell.

Each of the orifices is connected to a controlled source of pressurized fluid which in this instance is made up of the same source as the blow-molding gas. Each orifice is fitted with pressurized-fluid supply valves (not depicted). The valves can be operated in such a way as to vary the pressure in each of the chambers 42A, 42B.

The operation of the injection device 24 equipped with the controlled sealing mechanism 34 is now described.

When the injection device 24 is in its upper standby position, depicted in FIG. 1, a container 18 is inserted into the mold 12. Then the injection device 24 is made to move into its lower position of injection, depicted in FIG. 2, in which the bell 26 covers the neck 20 in a fluidtight manner, and in which the nozzle 32 is inserted inside the neck 20.

The nozzle 32 is then in its extreme upper position. The piston 41 therefore occupies its upper position of rest. For that, the lower chamber 42B is kept at a pressure higher than that of the upper chamber 42A. The seal 36 is in its raised retracted position, thus leaving the first radial gap "j1" open for the passage of blow-molding gas coming from the bell 26 at an optimal flow rate.

The piston 41 remains in this upper position of rest during the filling of the container 18 with the filling liquid. Thus, the blow-molding gas contained in the container 18 is able to escape to the bell 26 by passing through the first radial gap "j1" as the level of filling liquid gradually rises.

When the container 18 is filled with a determined percentage of the volume, for example 80%, the nozzle 32 is made to move by the piston 41 toward its intermediate position of insertion of the seal 36 into the neck 20, as depicted in FIG. 3. The second radial gap "j2" then remains in order to allow the residual blow-molding gas to escape.

According to an undepicted alternative form of the invention, the nozzle is made to move toward its intermediate position far sooner, for example right at the start of the filling with the filling liquid.

When it is necessary to pressurize the container 18 full of filling liquid to a high pressure, for example 40 bar, the piston 41 is made to move into its extreme lower position, as depicted in FIG. 4. To do this, the valves are operated in such a way that the pressure in the upper chamber 42A is higher than that of the lower chamber 42B.

The wedge 38 then applies to the seal 36 a force of outward radial expansion. The seal 36 is therefore deformed into its expanded position in which the second radial gap "j2" is completely plugged.

The high pressure in the container 18 then applies an outward radial force directly to the sleeve tube 40 to supply the action of the wedge 38.

The injection device 24 produced according to the teachings of the invention thus allows two different fluids to be injected into one and the same container 18, the second fluid passing through a central nozzle 32, while the first fluid passes through a first radial gap "j1" left between the central nozzle 32 and the neck 20 of the container 18.

Furthermore, the controlled sealing mechanism 34 allows the first radial gap "j1" to be plugged easily and completely in order to cause the pressure of the second fluid to rise without the risk of leakage.

The invention claimed is:

1. A device (24) for injecting at least two pressurized fluids into the axially oriented neck (20) of a container (18) in the parison state for forming a final container by deforming said container (18) by the successive injection of a first pressurized fluid then of a second pressurized fluid, the device (24) comprising:
   a first supply pipe (25) supplying a first pressurized fluid;
   a second supply pipe (30) supplying a second pressurized fluid, the second supply pipe (30) opening into an axial nozzle (32) which is intended to be arranged concentrically inside the neck (20) with a first radial gap (j1) so as to allow the first pressurized fluid to pass between the container (18) and the first supply pipe (25) through the first radial gap (j1);
   the second pressurized fluid used for forming the container (18) consisting of an incompressible filling liquid, characterized in that it comprises a sealing mechanism (34) that can be made to switch between an open position in which the first fluid is able to pass through the first radial gap (j1), and a closed position in which a seal (36) plugs the first radial gap (j1) between the nozzle (32) and the neck (20) of the container (18) in a fluidtight manner.

2. The device (24) as claimed in claim 1, characterized in that the first supply pipe (25) opens into a bell (26) surrounding the neck (20) of the preform in a fluidtight manner.

3. The device (24) as claimed in claim 1, characterized in that the seal (36) can be interposed radially in the first radial gap (j1) between the nozzle (32) and the internal wall of the neck (20).

4. The device (24) as claimed in claim 3, characterized in that the seal (36) is of annular shape and is arranged externally around the nozzle (32), the seal (36) being elastically deformable between a contracted state in which the first fluid can pass toward the inside of the container (18) via a second radial space (j2) left between the seal (36) and the internal wall of the neck (20), and an expanded state in which the seal (36) is radially pressed firmly against the internal wall of the neck (20) of the container (18) in order to plug the first radial space (j1) in a fluidtight manner.

5. The device (24) as claimed in claim 4, characterized in that the expansion of the seal (36) is brought about by the relative axial sliding of a conical annular wedge (38) of axial axis with respect to the seal (36).

6. The device (24) as claimed in claim 5, characterized in that the annular seal (36) is mounted to slide axially with respect to the nozzle (32) between:
   a raised retracted position in which the seal (36) is arranged vertically above the neck (20); and
   a lowered position of insertion in the first radial gap (j1) into the neck (20), in which position the seal (36) is interposed radially between the nozzle (32) and the neck (20).

7. The device (24) as claimed in claim 6, characterized in that the conical wedge (38) is carried by the external wall of the nozzle (32) which is mounted to slide axially with respect to the seal (36) so as to cause the seal (36) to switch into its expanded state when the seal (36) is in its lowered position of insertion.

8. The device (24) as claimed in claim 7, characterized in that the wedge (38) is formed as an integral part of the nozzle (32).

9. The device (24) as claimed in claim 8, characterized in that the sliding of the nozzle (32) is brought about by a piston (41) able to move axially in a cylinder (42).

10. The device (24) as claimed in claim 1, characterized in that the first fluid consists of a compressible blow-molding gas such as compressed air.

11. The device (24) as claimed in claim 1, characterized in that the device (24) is mounted to slide axially between:
   an upper standby position in which it is arranged some distance above the neck (20) of the container (18);
   a lowered injection position in which the device (24) is able to inject the first pressurized fluid and/or the second pressurized fluid.

* * * * *